(12) United States Patent
Fitzgerald et al.

(10) Patent No.: US 6,862,922 B2
(45) Date of Patent: Mar. 8, 2005

(54) RADIO WAVE MEASUREMENT OF SURFACE ROUGHNESS THROUGH ELECTROMAGNETIC BOUNDARY CONDITIONS

(75) Inventors: Rosa M. Fitzgerald, El Paso, TX (US); Donald E. Barrick, Redwood City, CA (US)

(73) Assignees: Board of Regents, The University of Texas System, Austin, TX (US); Codar Ocean Sensors, Ltd., Los Altos, CA (US)

( * ) Notice: Subject to any disclaimer, the term of this patent is extended or adjusted under 35 U.S.C. 154(b) by 152 days.

(21) Appl. No.: 10/150,520

(22) Filed: May 17, 2002

(65) Prior Publication Data

US 2003/0213291 A1 Nov. 20, 2003

(51) Int. Cl.[7] ................................................ G01B 5/28

(52) U.S. Cl. ........................................................ 73/105

(58) Field of Search ........................................... 73/105

(56) References Cited

PUBLICATIONS

Barrick and Fitzgerald, "The Failure of "Classic" Perturbation Theory at a Rough Neumann Boundary Near Grazing," *IEEE Transactions on Antennas and Propagation*, 48(9), 1452–1460, Sep. 2000.

Fitzgerald, "Reconstruction of the Surface Power Spectrum from Reflectivity Data," *Optics Letters*, 24(6), 364–366, Mar. 1999.

Marks' Standard Handbook for Mechanical Engineers, 10th ed., McGraw Hill, (Avallone and Baumeister, eds.), 1996.

Radar Handbook, 2nd ed., McGraw Hill, (Skolnik, ed.), 1990.

The Electrical Engineering Handbook, CRC Press, (Dorf, eds.), 1993.

Van Nostrand's Scientific Encyclopedia, 8th ed., Van Nostrand Reinhold, (Considine and Considine, eds.), 1995.

*Primary Examiner*—Robert Raevis
(74) *Attorney, Agent, or Firm*—Fulbright & Jaworski LLP

(57) ABSTRACT

Systems and methods for radio wave measurement of surface roughness using electromagnetic boundary conditions. A representative method includes measuring electromagnetic wave fields by monitoring a plurality of signals at several frequencies from different directions; obtaining a plurality of electromagnetic boundary conditions from the plurality of signals; and determining a roughness energy spectrum by utilizing the plurality of electromagnetic boundary conditions.

32 Claims, 1 Drawing Sheet

RADIO WAVE MEASUREMENT OF SURFACE ROUGHNESS THROUGH ELECTROMAGNETIC BOUNDARY CONDITIONS

BACKGROUND OF THE INVENTION

1. Field of the Invention

The invention relates generally to the field of radio waves. More particularly, the invention relates to measuring radio waves in the context of surface roughness. Specifically, a preferred implementation of the invention relates to the remote monitoring or measuring of the roughness statistics of surfaces.

2. Discussion of the Related Art

Knowledge of roughness statistics of surfaces, such as ocean, harbor, or river water roughness is highly useful. It can be used for, among other things, marine operations, safety, and environmental purposes. Since it may constantly change with time, simple, real-time methods of measuring roughness statistics of surfaces are always sought.

A problem with current technology for measuring roughness statistics has been that conventional instruments in the water are expensive, unreliable, and difficult to maintain. An example of current technology includes radars. Although useful for some aspects of roughness studies, radars are nevertheless expensive and involve complex electronics. Further, radars work with weak echo signals and involve transmitting a pulse and receiving an echo from water roughness scatter. This type of operation provides an indirect and delayed measurement, which is not ideal.

In view of the foregoing, it would be advantageous to obtain a surface roughness monitoring solution that measures a surface roughness directly, is easy to use and implement, and is relatively inexpensive to manufacture and maintain.

The referenced shortcomings of conventional methodologies mentioned above are not intended to be exhaustive, but rather are among many that tend to impair the effectiveness of previously known techniques concerning surface roughness measurements. Other noteworthy problems may also exist; however, those mentioned here are sufficient to demonstrate that methodology appearing in the art have not been altogether satisfactory and that a significant need exists for the techniques described and claimed herein.

SUMMARY OF THE INVENTION

According to one embodiment, the invention is a method is measuring electromagnetic wave fields by monitoring a plurality of signals at several frequencies from different directions. A plurality of electromagnetic boundary conditions are obtained from the plurality of signals. A roughness energy spectrum is obtained from the plurality of electromagnetic boundary conditions.

According to another embodiment, the invention involves a method in which a signal is received. The signal with accompanying noise is amplified with a RF amplifier of an appropriate gain tuned to a frequency. Noise is removed from the signal by passing the signal through a narrow pass filter. The signal is converted from a RF frequency to a low band frequency suitable for digitizing. The signal is then converted from an analog signal to a digital signal. The signal is processed by removing signal variations due to modulation and/or environmental effects, and a surface roughness is calculated from the processed signal.

According to another aspect of the invention, an apparatus for measuring the surface roughness of a surface is provided. The apparatus may include an electromagnetic wave receiver, an antenna, and a microprocessor. The electromagnetic wave is accepted by the electromagnetic wave receiver via the antenna. The microprocessor is configured to perform signal analysis to calculate a roughness by processing a surface admittance or a surface impedance.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF ILLUSTRATIVE EMBODIMENTS

Figure 1:
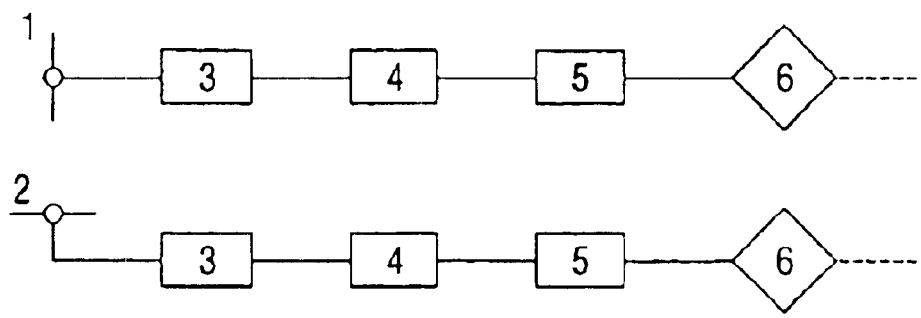
FIG. 1 illustrates a prior art receiver.

The invention and the various features and advantageous details thereof are explained more fully with reference to the nonlimiting embodiments that are illustrated in the accompanying drawings and detailed in the following description. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

To date, only indirect measurements of surface roughness have been available. Through theories, however, it has been shown that an analytical approach may be used to determined the power spectrum of the surface roughness from experimental data for the reflectivity of randomly rough surfaces. A one-dimensional, randomly rough, perfectly conducting surface that is illuminated by s-polarized light whose plane of incidence is perpendicular to the generators of the surface may be considered. The power spectrum may be obtained within the framework of phase perturbation theory.

A classic perturbation theory predicts an erroneous limit at grazing for vertically polarized plane wave scatter from an infinite perfectly conducting rough surface. Likewise, the attendant result for the specularly reflected mode also fails at grazing. However, recent research has shown how and why these errors occur, as well as how to reformulate the perturbational approach to handle the low-incidence angle region for a one-dimensionally rough Neumann boundary.

The result of this and other studies have shown that the fields scattered by the roughness vanishes in direct proportion to incidence angle above grazing. However, the result for the normalized roughness modified surface impedance becomes constant with angle near grazing. Scatter dependence on grazing angles can be explained in terms of the classic perturbation result multiplied by a propagation factor to the waves. The latter propagation factor includes the sum of the direct and specularly reflected waves at the surface. This quantity can be replaced by the appropriate surface-wave propagation factor for radiation from dipole antennas, thereby explaining the strong observed vertically polarized sea scatter at high frequency on and below the horizon.

Techniques of the present disclosure may exploit theories such as those above and utilize inexpensive equipment to effectively measure ocean surface roughness.

In one embodiment, techniques are provided for measuring a surface roughness without having to use electromagnetic signals generated especially for that purpose.

One embodiment works with strong signals from radio sources that exist or propagate near an interface and are modified in their properties by the roughness of a surface. One key element of the electromagnetic boundary conditions that manifests strong response to the roughness is the surface impedance and/or admittance.

Several embodiments evolve from this approach, each of which might be better suited for specific applications. All may involve simple radio receivers and antennas, such as dipoles and/or loops, and a very simple microprocessor chip for signal analysis and roughness extraction. These devices may be placed near, for example, water where roughness monitoring is desired, with wireless data links back to offices needing the data. One embodiment may even use existing radio signals already generated from sources not related to the process at hand, such as a radio station of opportunity, to measure roughness. Thus, one may not require special transmitters that emit electromagnetic signals designed specifically to measure roughness.

In one embodiment, an apparatus and method measure surface roughness parameters (the rms (root-mean-squared) height, spatial height energy spectrum, and directional properties) based on radio signals of arbitrary origin that arrive at a desired observation point. The principle behind these embodiments is not radar, i.e., not the scatter of transmitted energy to a receiver that is detected at a given target range by the echo delay. Rather, it is the direct measurement of fields themselves and the recognition that their strength and other properties (ratios of signals at different angles or positions) allow determination of the electromagnetic boundary conditions at the surface. These boundary conditions, in turn, are modified by the presence of roughness on the surface. Unlike radar echoes, the signals are strong because they are not weakened by scattering processes.

The origin of the signals used is not important. For example, they may come from satellites intended for other purposes (communication or navigation), or even from atmospheric noise. In other embodiments, it may be easier to generate signals with a separate apparatus. Monitoring signals at several frequencies from different directions may allow the determination of the roughness energy spectrum as a function of spatial wavenumber and angle. Compact, unattended devices to monitor roughness may be especially useful in applications where roughness changes and their monitoring is important (e.g., water surfaces on the seas, in harbors, or on rivers).

Figure 4:
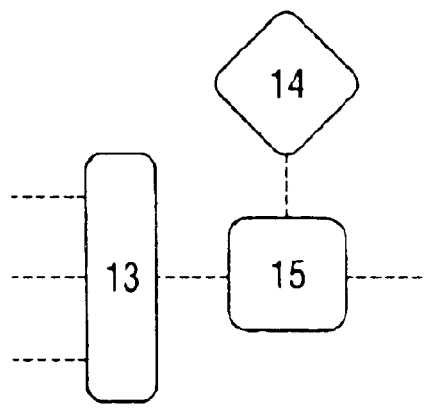
FIG. 4 illustrates a flowchart in accordance with another embodiment of the invention.

The following discussion explains an exemplary set of signal flow and processing steps for implementing embodiments of the present disclosure. In all of the four figures, signals and data flow proceeds from left to right. Boxes in FIG. 1 with sharp corners represent hardware components. In FIGS. 2, 3, and 4, the boxes with rounded corners represent algorithmic calculations, which may be done either on a computer or a microprocessor, firmware, an ASIC, or any other device suitable for performing mathematical steps. Connecting lines between the boxes that are solid represent analog signals flowing between them, while dashed lines represent digital data being passed between functional elements.

Figures 2, 3:
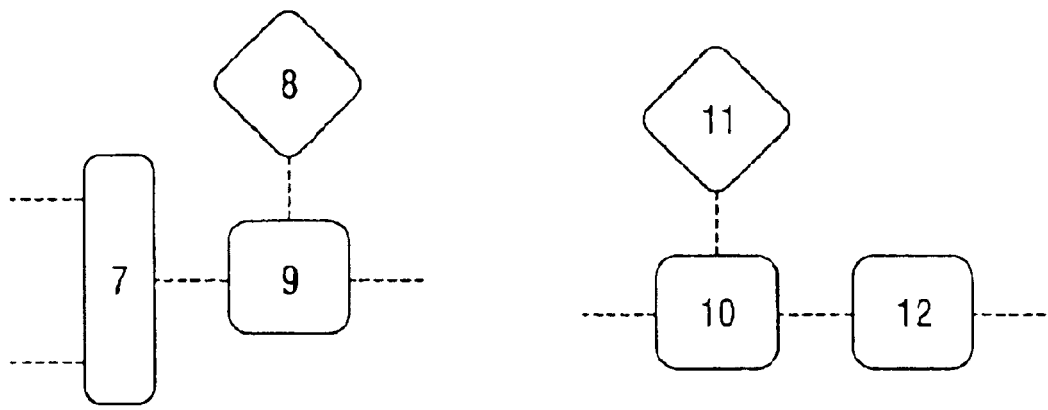
FIG. 2 illustrates a flowchart in accordance with an embodiment of the invention.
FIG. 3 illustrates a flowchart in accordance with another embodiment of the invention.

In FIG. 1, the hardware elements together may constitute a receiver. Typically, there may be as many as two or more antennas. These are denoted as 1 and 2. They may be either dipole antennas (to capture the electric field required for the surface impedance) or loop antennas (to capture the magnetic field required for the surface admittance). These antennas may be co-located or separated as described later in the disclosure. Finally, they may be oriented in the same direction (e.g., vertically), or oriented orthogonally to each other, as suggested in FIG. 1. An example of proper orientation and placement will be described subsequently.

Radio-frequency (RF) signals flow from the receiver antennas to block 3, which may be RF amplifiers of appropriate gain and noise figures tuned to the frequency band of intended operation (between HF, VHF, or UHF). Block 4 represents appropriate narrow-pass filters to reduce the noise with respect to the desired signal band. Block 5 constitutes one or more standard mixer stages, in which the signal is converted down from its incoming RF frequency to the desired low band suitable for digitizing. Block 6 represents an analog-to-digital (A/D) converter that transforms the analog signals into digital data streams with appropriate bit levels (dynamic range) to handle the expected signal variations over time. There are two parallel channels shown, and sampling between the two in the A/D is interleaved so the result constitutes essentially a simultaneous set of signals. One implementation of the entire receiver system confines it to a tiny printed circuit board no more than 2–3 cm on a side.

One embodiment, shown in FIG. 2, may colocate but orient the receive antennas of FIG. 1 orthogonally to each other. To provide an example, a transmitter (e.g., an FM radio station located across the San Francisco Bay) may be the signal source. The source can be either: (1) a cooperative transmitter; (2) a transmitter of opportunity like a convenient FM radio station of known frequency; or (3) external atmospheric noise that comes from lightning strokes and propagates to the receive antenna along or near the horizon, over the sea water. An embodiment of the invention may work with any of the three sources.

The receiver unit of FIG. 1 may be located across the bay at a distance of 10 km from the transmitter. The antennas are above but close to the rough water surface, although they are sufficiently high that they are not swamped by the sea waves one is trying to measure. One antenna 1 is vertical, while the other 2 is horizontal and aligned so it lies in the plane containing the signal arrival direction. The coherent, parallel receiving process digitizes the signals from the two antennas at the output on the right of FIG. 1, preserving their amplitudes and phases; this is essential. If receiver modules commercially available from CODAR Ocean Sensors, Ltd. (Los Altos, Calif.) are used, this may be done with standard in-phase and quadrature (I/Q) processing.

These simultaneous digital data sets represent the two inputs to the left of FIG. 2. In the first processing step 7 these signals may be divided as complex exponential numbers (including amplitude and phases). This divides out undesired signal variations due to modulation and/or environmental effects, which are unknown and irrelevant to the information extraction. Their ratio constitutes the complex normalized surface impedance, $\tilde{Z}$:

$$\tilde{Z} = \frac{\tilde{E}_X}{\tilde{E}_Z} \tag{Eq. 1}$$

where $\tilde{E}_X$ is the complex signal representing the horizontal component of the electric field aligned in the plane of propagation, and $\tilde{E}_Z$ represents the signal for the vertical field component.

In step 9, the surface impedance (or admittance) is converted into surface roughness parameters. One set of equations that may constitute the basis for this transformation is found in Barrick and Fitzgerald, and described in the following paragraphs. These equations are valid when the operating frequency range is chosen so that the expected roughness heights remain small compared with the radio wavelength (so that perturbation theory models apply).

At a perfectly conducting interface, the roughness-modified impedance/admittance equations are as follows, where $Z(\omega, \vartheta)$ is the impedance, and $Y(\omega, \vartheta)$ is the admittance:

$$Z(\omega, \vartheta) = \frac{\omega}{c} \int_{-\infty}^{+\infty} \frac{\left(\frac{\omega}{c}\sin\vartheta - p\right)^2 S\left(\frac{\omega}{c}\sin\vartheta - p\right) dp}{\sqrt{\left(\frac{\omega}{c}\right)^2 - p^2}} \text{; and} \tag{Eq. 2}$$

$$\frac{1}{y(\omega, \vartheta)} = \frac{\omega}{c} \int_{-\infty}^{+\infty} S\left(\frac{\omega}{c}\sin\vartheta - p\right)\sqrt{\left(\frac{\omega}{c}\right)^2 - p^2}\, dp \tag{Eq. 3}$$

The one dimensional roughness height spectrum, S(p), is defined according to the oceanographic convention (which differs from other definitions by factors of 2 and π):

$$h^2 = \int_{-\infty}^{+\infty} S(p)dp \tag{Eq. 4}$$

where h is the rms roughness height.

One such implementation of this embodiment relates to the creation of a "tilt" of the vector components of the fields near the surface caused by the surface impedances and admittances. This tilt can be measured by: (a) a single sensor/receiver (dipole for the electric field or coil for the magnetic field) that is rotated sequentially to the three orthogonal positions (vertical and two horizontal alignments), measuring the signals vs. angle or (b) three sensors orthogonally positioned about the same phase center to capture and process the field vector components simultaneously. The ratio of the vertical to the horizontal component along the direction of the signal source is the surface impedance or admittance. This ratio is a complex number, whose real and imaginary parts (or amplitude and phase) are a measure of the roughness and its spatial spectrum in the vicinity of the "tiltmeter."

In one embodiment where the entire roughness height spectrum may be desired, these measurements may be made at a spectrum of frequencies spanning a wide range to allow reconstitution of the wavenumber spectrum. If only the waveheight is required, this may be done from measurements at a single frequency (like that of an FM station); in the most common applications, usually only roughness waveheight is required. Often this mathematical inversion calculation of step 9 may be done in real time on a microprocessor.

If the frequency of operation or the roughness height exceeds the limit for perturbation validity, then a database representing the conversion from impedance or admittance to roughness parameters may be pre-calculated (e.g., from exact rather than perturbation theory, or from empirically derived observations) and stored in a memory device, block 8. Step 9 then includes a comparison of the measured quantity to the data-base value to determine the roughness parameters. These may be pre-calculated only once, usually by an exact electromagnetic technique like moment-method computer codes that are now standard in the industry.

Another embodiment, shown in FIG. 3, capitalizes on the variation of signal strength of a radio signal propagating at or near a grazing incidence as the roughness changes. At a sufficient distance from the source, the dominant component of the electric/magnetic field strength is inversely proportional to the square of the surface impedance/admittance calculated at and near grazing. This signal strength varies in amplitude with the roughness present on the surface along the path of propagation.

In this implementation, only one antenna may be needed in FIG. 1. This could be a vertical dipole or monopole to capture the electric field for surface impedance measurement. This embodiment represents perhaps the simplest implementation of the disclosure, leading to a very inexpensive, compact unit, but providing only one piece of information: the roughness height, which is the most important descriptor for most applications.

This embodiment requires the measurement of absolute signal strength. The latter varies for a surface wave above a rough sea or water surface as the roughness height changes. The equation for the power received, P, is:

$$P = \frac{KS}{|\tilde{Z}|^4} \tag{Eq. 5}$$

where K is an unchanging system gain constant that is measured and stored during a calibration phase, and S is the radiated power signal intensity of the source. A possible source in this case, would be an FM station, where FCC law requires broadcasting at constant approved power levels, and whose frequency modulation does not change the level of the signal power being radiated.

During a calibration phase, the constants K and S are measured, along with a reference level of surface impedance magnitude, $|\tilde{Z}|$, for a given roughness height magnitude. This is stored in 11 and compared with the signal power in 10 to get the present value of surface impedance magnitude. Then step 12 performs the same inversion function as step 9 of FIG. 2, based on a pre-calculated array of numbers or on calculations done on the fly, using Equations 2, 3, and 4.

As shown in FIG. 4, in the third embodiment, a satellite signal may be used as the source. A good candidate are the signals that radiate to earth in the VHF and UHF regions from satellites which are positioned for various purposes. One example of such signals are GPS (global positioning system) signals in the UHF region. These signals' frequencies are well known and positions of the satellites they originate from may be calculated in off-the-shelf inexpensive GPS receivers. By measuring the surface reflectivity from the standing wave ratio near the surface, signals that appear at a desired observation point near the earth or sea close to the zenith (vertical incidence) can be used to measure the impedance or admittance of the surface. In one implementation of this embodiment, the horizontal electric or magnetic field is measured at two heights, approximately a quarter of a wavelength apart in order to estimate the standing wave ratio near the boundary. The ratio of the depth of the nulls to the maxima (the SWR, or standing wave ratio) is a measure of the impedance or admittance at the surface dictated by the reflection at the boundary. This, in turn, contains the desired information about the surface roughness.

In another implementation of this embodiment, there could be three antennas spaced at heights above the mean water surface of h1, h2, and h3. These could be spaced at distances h2=h1+λ/4 and h3=h1+3λ/8, where λ is the known radio wavelength. The three antennas of FIG. 1 in this case would be horizontal dipoles (or loops). A standing wave is produced near the interface representing the sum of the incident downcoming signal and the surface specularly reflected signal. For GPS signals, the quarter-wavelength signal spacing is approximately seven centimeters. The three antennas are sampling this standing wave pattern from their complex voltage signals. The three complex signals outputted from the three A/D converters would be $\tilde{V}_1$, $\tilde{V}_2$, and $\tilde{V}_3$ given by:

$$\tilde{V}_1 = Ae^{ikh_1} + Re^{-jkh_1} \quad \text{(Eq. 6)}$$

$$\tilde{V}_2 = Ae^{ikh_1+j\pi/2} + Re^{-jkh_1-j\pi/2} \quad \text{(Eq. 7)}$$

$$\tilde{V}_3 = Ae^{ikh_1+j3\pi/4} + Re^{-jkh_1-j3\pi/4} \quad \text{(Eq. 8)}$$

The quantity k is the known radio wavenumber defined in terms of the wavelength as: $k=2\pi/\lambda$. The common factor A is an unknown and irrelevant constant that is eliminated. Two unknowns remain: the height $h_1$ of the lowest antenna above the water and the surface specular reflection coefficient, $\tilde{R}$. The height may vary with water level due to tides, for example. It is also eliminated from these equations mathematically in a straightforward manner, because there are more equations than unknowns. The quantity desired, $\tilde{R}$, is then retrieved. All of this is done in step 13, with the three digitized complex voltages as the inputs to this block on FIG. 4.

The Fresnel specular reflection coefficient is related to the surface impedance or admittance near normal incidence by the relation:

$$\tilde{R} = \frac{\cos\vartheta - \tilde{Z}}{\cos\vartheta + \tilde{Z}} \quad \text{(Eq. 9)}$$

where υ is the known angle of the downcoming signal from the vertical. Within about 10° from vertical, this cosine factor can be approximated by unity, and the surface impedance and admittance become equal to each other. In any event, this relation above is solved for the surface impedance, $\tilde{Z}$ in step 13.

Then in step 15 the surface impedance or admittance is related to roughness parameters through the same procedure described as step 9. However, different model equations must be used when incidence angles are near normal incidence here ($\vartheta=0°$) than in the previous embodiment discussed, when the incidence angle lies near grazing ($\vartheta=90°$).

$$R_v(\omega, \vartheta) = \frac{\sin\vartheta - z(\omega, \vartheta)}{\sin\vartheta + z(\omega, \vartheta)} \text{ (for vertical polarization)} \quad \text{(Eq. 10)}$$

$$R_h(\omega, \vartheta) = \frac{\sin\vartheta - y(\omega, \vartheta)}{\sin\vartheta + y(\omega, \vartheta)} \quad \text{(Eq. 11)}$$

The database 14 allows for the fact that these relationships may be pre-calculated and stored for comparison within step 15, rather than calculated on the fly.

The equipment of the present disclosure may also be included in a kit. The kit can include some, or all, of the components that comprise the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term approximately, as used herein, is defined as at least close to a given value (e.g., preferably within 10% of, more preferably within 1% of, and most preferably within 0.1% of).

PRACTICAL APPLICATIONS OF THE INVENTION

A practical application of the invention that has value within the technological arts is for measuring the water roughness for oceans, harbors, or rivers. There are virtually innumerable other uses for the invention; in fact, the invention can be used for any application in which the roughness of a surface is desired.

ADVANTAGES OF THE INVENTION

A tilt sensor, representing an embodiment of the invention, can be cost effective and advantageous at least because it involves simple radio receivers and antennas and a basic microprocessor, instead of complex equipment. This improves quality and/or reduces costs compared to previous approaches.

All the embodiments of the invention described herein can be made and used without undue experimentation in light of the disclosure.

The appended claims are not to be interpreted as including means-plus-function limitations, unless such a limitation is explicitly recited in a given claim using the phrases "means for" and/or "step for."

REFERENCES

Each of the following references are hereby incorporated by reference in their entirety.

Donald E. Barrick and Rosa Fitzgerald, "The Failure of "Classic" Perturbation Theory at a Rough Neumann Boundary Near Grazing," *IEEE Transactions on Antennas and Propagation*, Vol. 48, No. 9, September 2000, pp. 1452–1460.

Rosa Fitzgerald, "Reconstruction of the Surface Power Spectrum from Reflectivity Data," *Optics Letters*, Vol. 24, No. 6, Mar. 15, 1999, pp.364–366.

Van Nostrand's Scientific Encyclopedia, 8th ed., Van Nostrand Reinhold, (Douglas M. Considine et al. eds.), 1995.

Marks Mechanical Engineering Handbook, 10th ed., McGraw Hill, (Eugene A. Avallone et al. eds.), 1996.

The Electrical Engineering Handbook, CRC Press, (Richard C. Dorf et al. eds.), 1993.

Radar Handbook, 2nd ed., McGraw Hill, (Merrill I. Skolnik ed.), 1990.

What is claimed is:

1. A method for measuring a surface roughness, comprising:
   measuring electromagnetic wave fields by monitoring a plurality of signals at several frequencies from different directions;
   obtaining a plurality of electromagnetic boundary conditions from the plurality of signals; and
   determining a roughness energy spectrum by utilizing the plurality of electromagnetic boundary conditions.

2. The method of claim 1, wherein the electromagnetic wave fields include radio waves that exist or propagate near a water interface and are modified in their properties by a roughness of a surface.

3. The method of claim 1, wherein the plurality of electromagnetic boundary conditions includes a spatial wave number and an angle.

4. The method of claim 3, wherein the roughness energy spectrum is a function of the spatial wave number and the angle.

5. The method of claim 1, wherein a surface impedance and a surface admittance are elements in the plurality of electromagnetic boundary conditions.

6. The method of claim 5, wherein the surface impedance and the surface admittance influence the plurality of electromagnetic boundary conditions by creating a tilt of vector components of the fields.

7. The method of claim 6, wherein the tilt is measured by a single sensor.

8. The method of claim 7, wherein the single sensor is a dipole sensor, which detects an electric field.

9. The method of claim 7, wherein the single sensor is a loop sensor, which detects a magnetic field.

10. The method of claim 1, wherein measuring electromagnetic wave fields includes observing a strength of a radio signal propagating at or near a grazing incidence boundary.

11. The method of claim 10, wherein the strength varies in amplitude with a roughness present on a surface along a path of propagation.

12. The method of claim 1, further comprising transmitting a result to a data receiver.

13. A computer program, comprising computer or machine readable program elements translatable for implementing the method of claim 1.

14. A method for measuring a roughness of a surface, comprising:
   receiving a signal;
   amplifying the signal with a RF amplifier of a gain tuned to a frequency of the signal;
   removing noise by passing the signal through a narrow pass filter;
   converting the signal from a RF frequency to a low band frequency suitable for digitizing;
   converting the signal from an analog signal to a digital signal;
   processing the signal by removing signal noise variations due to modulation and/or environmental effects; and
   calculating a surface roughness by processing a surface admittance or a surface impedance.

15. The method of claim 14, wherein the signal is a single frequency signal.

16. The method of claim 14, further comprising receiving a plurality of signals.

17. The method of claim 16, wherein the plurality of signals is received by an antenna that lies in the plane containing the signal's arrival direction and by an antenna that lies in a plane perpendicular to the signal's arrival direction.

18. The method of claim 17, further comprising calculating a surface impedance from the plurality of signals received by the antenna that lies in the plane containing the signal's arrival direction and from the plurality of signals received by the antenna that lies in the plane perpendicular to the signal's arrival direction.

19. The method of claim 14, wherein the surface roughness is dependent on a signal strength of the signal as the surface roughness changes.

20. The method of claim 19, wherein the signal is from a source that emits signals at a constant power level.

21. The method of claim 19, further comprising measuring a reference level of surface impedance magnitude for a given roughness height magnitude.

22. The method of claim 21, further comprising comparing the reference level with the signal strength to obtain a surface impedance.

23. The method of claim 14, wherein the signal comprises a satellite signal.

24. The method of claim 23, wherein the satellite signal is from a satellite positioned substantially close to a position vertical to a receiver that received the signal.

25. The method of claim 23, wherein an angle of the satellite signal from a vertical is calculated.

26. The method of claim 25, further comprising obtaining a surface impedance by measuring the surface reflectivity from the standing wave ratio near the surface based on the satellite signal.

27. The method of claim 14, wherein calculating the surface roughness includes comparing a surface impedance or a surface admittance with pre-calculated values.

28. The method of claim 14, further comprising transmitting a calculated surface roughness to a data receiver.

29. A computer program, comprising computer or machine readable program elements translatable for implementing the method of claim 14.

30. An apparatus, comprising:
    an electromagnetic wave receiver;
    an antenna coupled to the electromagnetic wave receiver; and
    a microprocessor coupled to the electromagnetic receiver, the microprocessor configured to calculate a surface roughness by processing a surface admittance or a surface impedance from the electromagnetic wave.

31. The apparatus of claim 30, further comprising an electromagnetic signal generator coupled to the antenna.

32. The apparatus of claim 30, further comprising a data transfer mechanism coupled to the microprocessor.

* * * * *